(12) United States Patent
Greiss et al.

(10) Patent No.: US 8,864,616 B2
(45) Date of Patent: Oct. 21, 2014

(54) POWER TRANSFER UNIT

(75) Inventors: Bernd Greiss, Oakland Township, MI (US); Austin R. Gerding, Royal Oak, MI (US)

(73) Assignee: GKN Driveline North America Inc., Auburn Hills, MI (US)

( * ) Notice: Subject to any disclaimer, the term of this patent is extended or adjusted under 35 U.S.C. 154(b) by 0 days.

(21) Appl. No.: 14/110,745

(22) PCT Filed: Apr. 18, 2012

(86) PCT No.: PCT/US2012/034001
§ 371 (c)(1),
(2), (4) Date: Oct. 9, 2013

(87) PCT Pub. No.: WO2012/145350
PCT Pub. Date: Oct. 26, 2012

(65) Prior Publication Data
US 2014/0021005 A1 Jan. 23, 2014

Related U.S. Application Data

(60) Provisional application No. 61/476,693, filed on Apr. 18, 2011.

(51) Int. Cl.
*F16H 48/06* (2006.01)
*F16J 15/32* (2006.01)
*B60K 17/02* (2006.01)
*F16J 15/00* (2006.01)

(52) U.S. Cl.
CPC .............. *B60K 17/02* (2013.01); *F16J 15/3252* (2013.01); *F16J 15/3232* (2013.01); *F16J 15/002* (2013.01)

USPC .......................................................... 475/222

(58) Field of Classification Search
USPC ........... 475/222, 216, 83; 74/606 R; 192/112, 192/113.1, 113.3; 277/345, 346, 347
See application file for complete search history.

(56) References Cited

U.S. PATENT DOCUMENTS 3,414,100 A 12/1968 Spencer
4,381,828 A 5/1983 Lunn et al.
(Continued)

FOREIGN PATENT DOCUMENTS

DE 3801351 A1 8/1989
DE 3822518 A1 1/1990
(Continued)

*Primary Examiner* — Saul Rodriguez
*Assistant Examiner* — David J Hlavka
(74) *Attorney, Agent, or Firm* — Jennifer M. Brumbaugh; Reising Ethington P.C.

(57) ABSTRACT

A power transfer unit comprising a first shaft configured to receive an input torque from a first vehicle component, a second shaft configured to selectively receive the torque from the first shaft and transmit the torque to a second vehicle component, an engaging mechanism, a housing configured to enclose at least a portion of the power transfer unit, and a seal system having a first seal and a second seal. The engaging mechanism configured to operate in a first mode and a second mode. When in the first mode, the engaging mechanism selectively couples the second shaft to the first shaft, and when in the second mode, the second shaft is decoupled from the first shaft. The first seal is disposed between the housing and a first end of the second shaft, and the second seal is disposed between the housing and a second end of the second shaft.

19 Claims, 6 Drawing Sheets

(56) References Cited

U.S. PATENT DOCUMENTS

| | | |
|---|---|---|
| 4,684,000 A | 8/1987 | Brown |
| 4,915,190 A | 4/1990 | Iwata |
| 5,016,724 A | 5/1991 | Steinhagen et al. |
| 5,046,576 A | 9/1991 | Miyawaki |
| 5,078,412 A * | 1/1992 | Baumgarth ............ 277/345 |
| 5,086,867 A | 2/1992 | Hirota et al. |
| 5,105,901 A | 4/1992 | Watanabe et al. |
| 5,105,902 A | 4/1992 | Wilson et al. |
| 5,119,900 A | 6/1992 | Watanabe et al. |
| 5,307,965 A | 5/1994 | Worrel |
| 5,407,024 A | 4/1995 | Watson et al. |
| 5,411,110 A | 5/1995 | Wilson et al. |
| 5,431,872 A | 7/1995 | Sink |
| 5,485,894 A | 1/1996 | Watson et al. |
| 5,562,566 A | 10/1996 | Yang |
| 5,609,219 A | 3/1997 | Watson et al. |
| 5,934,430 A | 8/1999 | Kolomeitsev et al. |
| 5,951,428 A | 9/1999 | Itoh et al. |
| 5,954,150 A | 9/1999 | Miller et al. |
| 6,000,488 A | 12/1999 | Atkinson |
| 6,062,330 A | 5/2000 | Watson et al. |
| 6,079,539 A | 6/2000 | Fetcho et al. |
| 6,113,512 A | 9/2000 | Williams |
| 6,263,995 B1 | 7/2001 | Watson et al. |
| 6,296,590 B1 | 10/2001 | Gassmann |
| 6,592,487 B2 | 7/2003 | Gassmann |
| 6,598,721 B2 | 7/2003 | Schmidl |
| 6,644,428 B2 | 11/2003 | Gady et al. |
| 6,705,964 B2 | 3/2004 | Nagai et al. |
| 6,725,990 B2 | 4/2004 | Bowen |
| 6,805,653 B2 | 10/2004 | Krzesicki et al. |
| 6,814,682 B2 | 11/2004 | Spitale |
| 6,974,400 B2 | 12/2005 | Williams |
| 6,997,299 B2 | 2/2006 | Brissenden et al. |
| 7,011,596 B2 | 3/2006 | Haka |
| 7,096,990 B2 | 8/2006 | Borgen et al. |
| 7,150,694 B2 | 12/2006 | Mizon et al. |
| 7,207,409 B2 | 4/2007 | Downs |
| 7,210,565 B2 * | 5/2007 | Yamazaki et al. ............ 192/35 |
| 7,331,896 B1 | 2/2008 | Kroppe |
| 7,485,063 B2 * | 2/2009 | Nett et al. ............ 475/223 |
| 7,533,754 B2 | 5/2009 | Burrows et al. |
| 7,546,914 B2 | 6/2009 | Schranz et al. |
| 7,553,251 B2 | 6/2009 | Nett et al. |
| 7,694,793 B2 | 4/2010 | Wittkopp et al. |
| 7,958,802 B2 * | 6/2011 | Marin et al. ............ 74/606 R |
| 8,042,642 B2 | 10/2011 | Marsh et al. |
| 8,047,323 B2 | 11/2011 | Downs et al. |
| 8,443,954 B2 | 5/2013 | Quehenberger et al. |
| 8,667,864 B2 * | 3/2014 | Kenmotsu et al. ......... 74/606 R |
| 2002/0074202 A1 | 6/2002 | Schmidl |
| 2007/0023249 A1 | 2/2007 | Schranz et al. |
| 2007/0289797 A1 | 12/2007 | Bowen |
| 2008/0113843 A1 | 5/2008 | Kenmotsu et al. |
| 2010/0058890 A1 | 3/2010 | Palazzolo et al. |
| 2010/0094519 A1 | 4/2010 | Quehenberger et al. |

FOREIGN PATENT DOCUMENTS

| | | |
|---|---|---|
| DE | 10010709 A1 | 9/2001 |
| DE | 10103789 A1 | 9/2001 |
| DE | 10160951 A1 | 7/2002 |
| DE | 102005021460 A1 | 11/2006 |
| DE | 102005021633 A1 | 11/2006 |
| DE | 102006017693 A1 | 11/2006 |
| DE | 102006024941 A1 | 3/2007 |
| DE | 102006043330 A1 | 4/2007 |
| DE | 102008008458 A1 | 9/2008 |
| DE | 102008044791 A1 | 4/2009 |
| JP | 60135327 A | 7/1985 |
| WO | 2005/073602 A1 | 8/2005 |
| WO | 2006/128637 A1 | 12/2006 |
| WO | 2008/003366 A1 | 1/2008 |
| WO | 2008/027224 A2 | 3/2008 |

* cited by examiner

POWER TRANSFER UNIT

CROSS-REFERENCE TO RELATED PATENT APPLICATIONS

This application claims the benefit and priority to U.S. Provisional Patent Application No. 61/476,693, filed Apr. 18, 2011. U.S. Provisional Patent Application No. 61/476,693 is incorporated by reference herein in its entirety.

TECHNICAL FIELD

The present application relates generally to the field of drive trains for motor vehicles. More specifically, the present application relates to a power transfer unit for use in a drive train system to selectively provide driving torque to the rear wheels, wherein the power transfer unit includes an improved sealing system that reduces losses and improves lubrication therein.

BACKGROUND ART

In some motor vehicles (more commonly in trucks and Sport Utility Vehicles), it has been known to have a drive train which provides switchable four-wheel drive. These systems typically have the rear wheels continuously driven by torque from the propshaft, which is driven by the transmission. These systems tend to have user-switchable four-wheel drive, such that the user through a lever (e.g., shifter, switch) engages a transfer case that redistributes a portion of the torque from the rear wheels to the front wheels. These systems are primarily designed to operate during low traction conditions, such as slippery conditions created by snow or off-road type conditions.

In other motor vehicles (more commonly in passenger cars, such as sedans), it has been known to have a drive train that provides all wheel drive (AWD). These systems typically have one set of wheels (typically the front wheels) driven by torque from the transmission and, as required, torque is redistributed to the other set of wheels (typically the rear wheels), by actuation of a clutch system. This redistribution of torque may be automatically transferred by the vehicle when it determines that the front wheels have angular velocities that differ by a predetermined amount from the angular velocities of the rear wheels, which indicates slippage of the front wheels created by torque exceeding traction. When the vehicle determines this difference in angular velocities between wheels, it engages the clutch mechanism, which couples a driveshaft to the operating power train system that redistributes some of the torque generated through the power train to the rear wheels. This system reduces the torque driven to the slipping wheels to a point to achieve traction again, and redistributes the reduced torque to the non-slipping wheels.

It would be advantageous to have a drive train system that provides driver selectable AWD capability by redistributing torque more efficiently (i.e., less power loss). It would also be advantageous to have an AWD drive train system that may be produced at a lower cost and with greater reliability than conventional AWD systems.

SUMMARY

One embodiment relates to a power transfer unit comprising a first shaft configured to receive an input torque from a first vehicle component, a second shaft configured to selectively receive the torque from the first shaft and transmit the torque to a second vehicle component, an engaging mechanism, a housing configured to enclose at least a portion of the power transfer unit, and a seal system having a first seal and a second seal. The second shaft includes a first end and a second end. The engaging mechanism is configured to operate in a first mode and a second mode. When in the first mode, the engaging mechanism selectively couples the second shaft to the first shaft, and when in the second mode, the second shaft is decoupled from the first shaft. The first seal is disposed between the housing and the first end of the second shaft, and the second seal is disposed between the housing and the second end of the second shaft.

DETAILED DESCRIPTION

With general reference to the Figures, disclosed herein are power transfer units for use in power train or drive train systems of vehicles for transferring propulsion power, such as from a front set of drive wheels to a rear set of drive wheels. The power transfer units include a first shaft (e.g., input shaft), a second shaft (e.g., disconnect shaft) that is selectively coupled and decoupled from the first shaft by an engaging mechanism (e.g., clutch mechanism), a housing that encloses at least a portion of the power transfer unit, and a seal system. The seal system includes a first seal that is provided or disposed between the second shaft and the housing. For example, the first seal may be provided between a first end of the second shaft and a first extension of the housing. The seal system may also include additional seals. For example, the seal system may include a second seal that is disposed between a second end of the second shaft and a second extension of the housing, where the first and second seals enclose a volume of the power transfer unit, which may include a first fluid, such as gear lube, for lubricating the working elements inside the volume.

Figure 1:
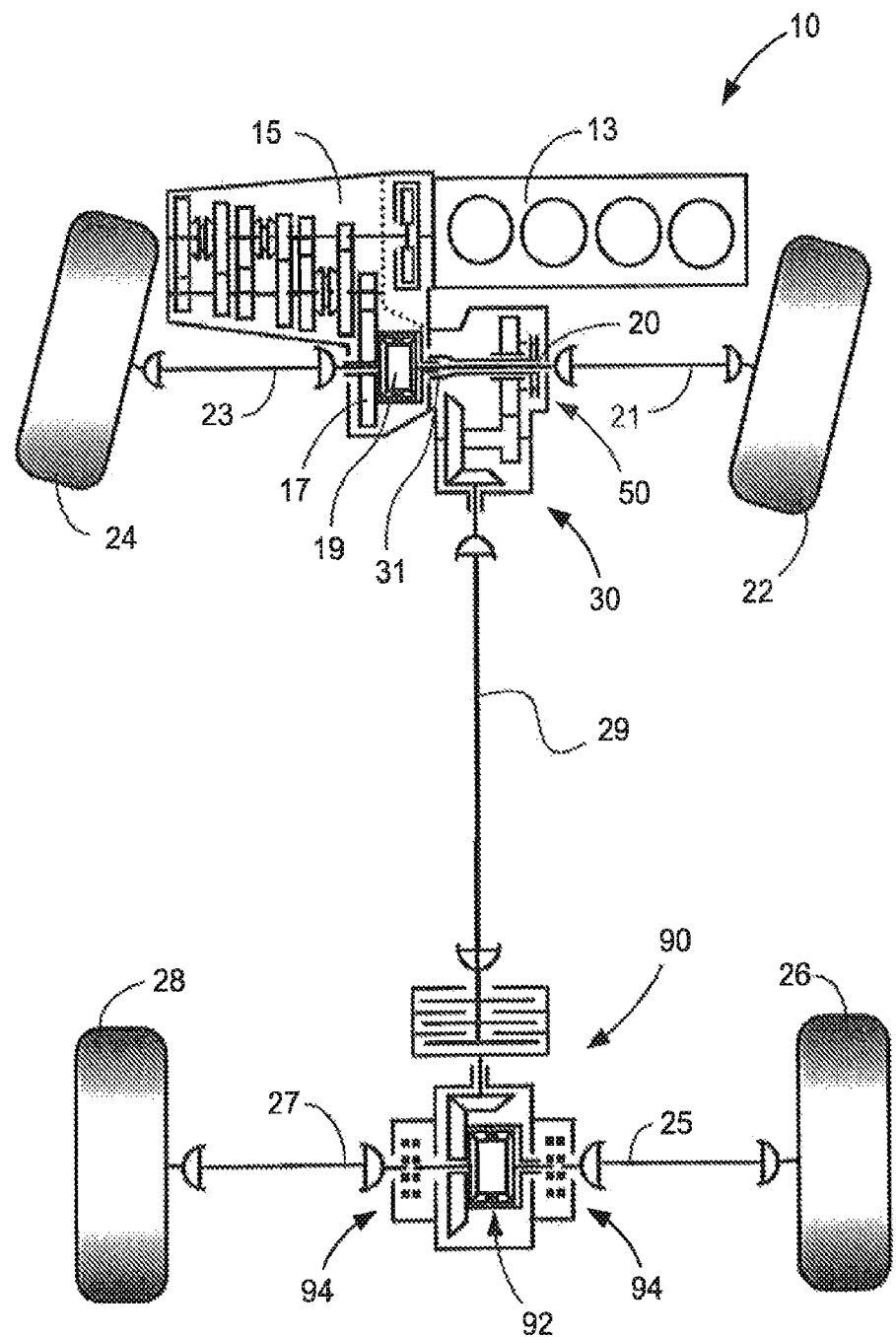
FIG. 1 is a top schematic view of a drive train system according to an exemplary embodiment.
Figure 2:
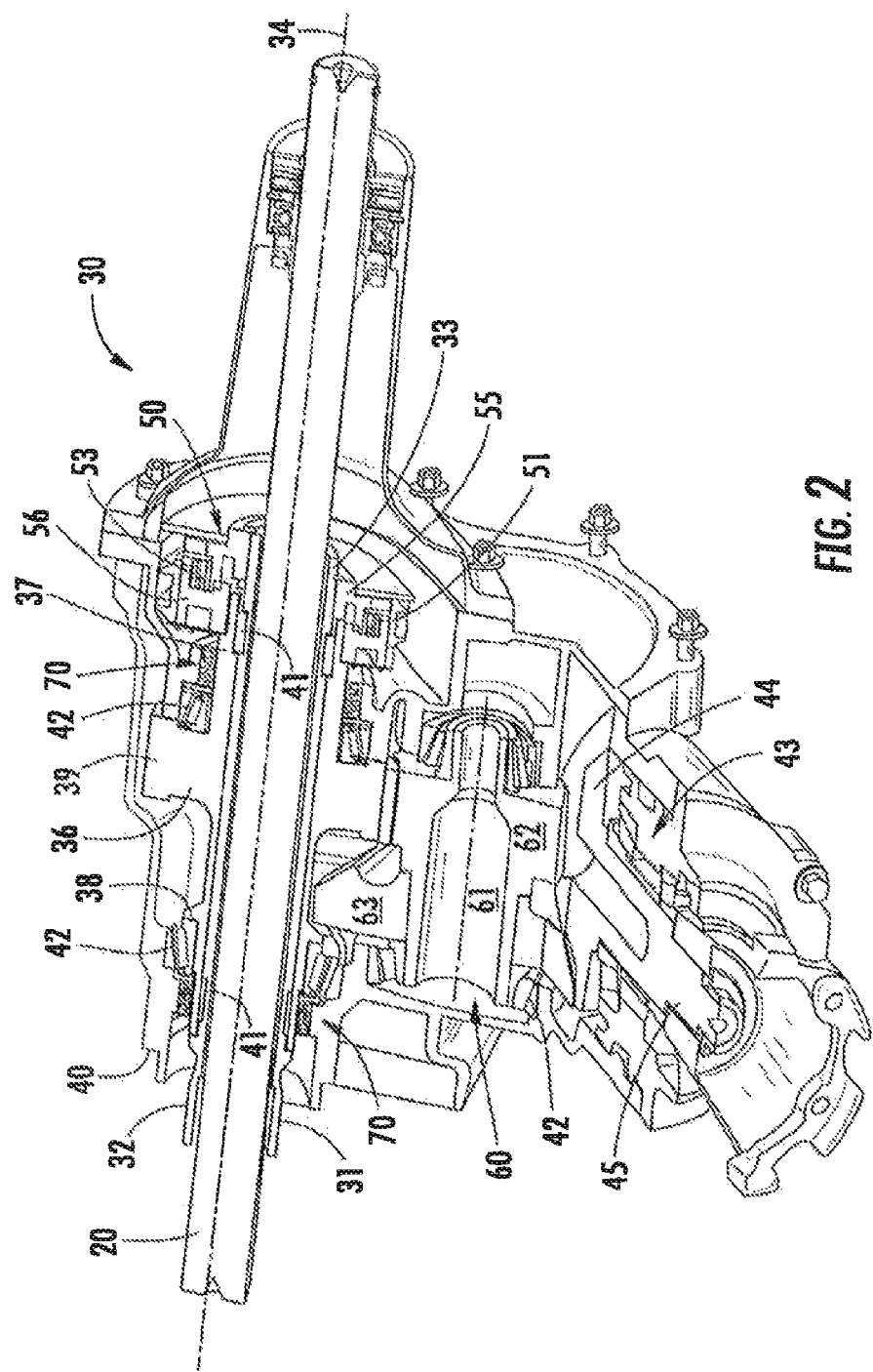
FIG. 2 is a sectional perspective view of an exemplary embodiment of a power transfer unit for use within a drive train system, such as the drive train system of FIG. 1.
Figure 3:
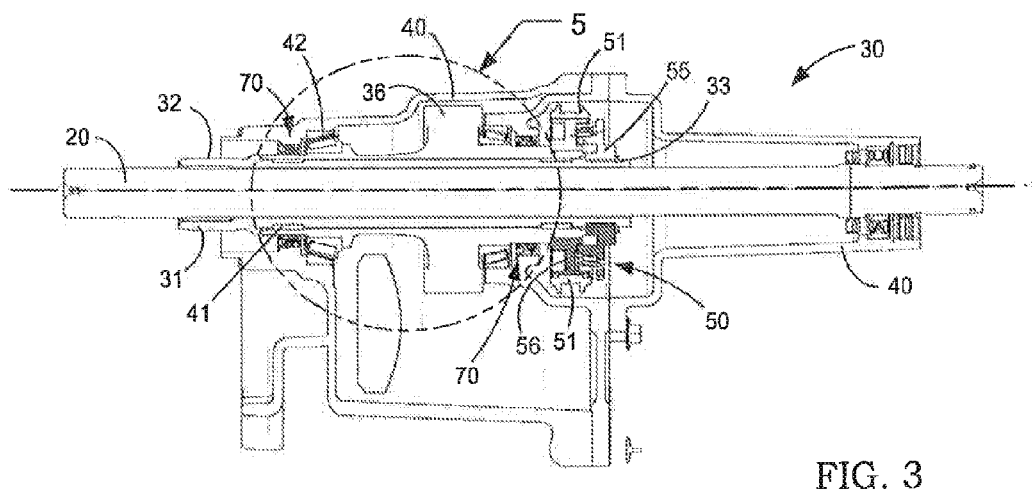
FIG. 3 is a top view of the power transfer unit of FIG. 2 configured with the disconnect shaft decoupled from the input shaft, which corresponds to the vehicle being configured in the two-wheel drive mode of operation.

FIG. 1 illustrates a power train or drive train system 10 that is configured for use in a motor vehicle and provides the propulsion power to propel or move the vehicle. According to an exemplary embodiment, the drive train system 10 includes an engine 13, a transmission 15, a final drive unit 17, a front differential assembly 19, a first (or front right) driveshaft 21, a second (or front left) driveshaft 23, a third (or rear right) driveshaft 25, a fourth (or rear left) driveshaft 27, a first (or front right) wheel 22, a second (or front left) wheel 24, a third (or rear right) wheel 26, a fourth (or rear left) wheel 28, a propshaft 29, a power transfer unit 30, and a rear drive unit 90. The engine 13 may be mounted transversely or in-line longitudinally down the vehicle, and is configured to provide output power and torque to the transmission 15, which is configured to provide power and torque as required to the final drive unit 17. The final drive unit 17 is configured to provide power and torque into the front differential assembly 19, where the final drive unit 17 may include at least one beveled gear, hypoid gear, or helical gear that may be configured to transfer torque into a mating and meshed gear of the front differential assembly 19. The first and second driveshafts 21, 23 are rotationally coupled to the front differential assembly 19, thereby allowing the driving torque to be transferred from the engine 13 through the transmission 15, through the final drive unit 17, and into the front differential assembly 19, thus driving the first and second driveshafts 21, 23. The front differential assembly 19 includes a gear train that allows the first and second driveshafts 21, 23 to rotate at different angular velocities to accommodate vehicle turning or loss of traction by one driveshaft.

The power transfer unit (PTU) 30 includes an input shaft 31, which may be coupled to a component (e.g., a case, a carrier, a side-gear) of the front differential assembly 19, and a first clutch mechanism 50, which may selectively (disengage) or decouple the input shaft 31 to the propshaft 29 through a gear assembly. The power transfer unit 30 and gear assembly are discussed in greater detail below. According to an exemplary embodiment, the drive train includes an intermediate drive shaft 20 that is connected to the first drive shaft 21 to rotate the first wheel 22 of the vehicle.

The electronic control unit (ECU) or electronic control module (ECM) of the vehicle may actuate engagement of the first clutch mechanism 50, coupling the propshaft 29 to the input shaft 31 through the PTU 30. The propshaft 29 is coupled to the rear drive unit (RDU) 90, which includes a rear differential assembly 92. Thus, the torque transferred through the propshaft 29 may be transferred into the rear differential assembly 92. The rear differential assembly 92 includes a gear train that allows the third and fourth driveshafts 25, 27 to rotate at different angular velocities to accommodate vehicle turning or loss of traction by one driveshaft. The ECU of the vehicle also actuates a vacuum system or another actuating system (e.g., a hydraulic system, an electronic system) that causes one or more than one second clutch mechanism 94 included within the RDU 90 to engage substantially simultaneously, which transfers the torque from the rear differential assembly 92 to both the third and fourth driveshafts 25, 27. The vacuum or actuating system may be activated or engaged subsequent to actuation of the first clutch mechanism 50 and after the drive train system 10 has been brought up to speed, or may be activated prior to actuation of the clutch mechanism 50.

FIGS. 2-5 illustrate an exemplary embodiment of a PTU 30 for use in a drive train system, such as the drive train system 10 of FIG. 1. The PTU 30 includes an input shaft 31, a disconnect shaft 36, at least one seal assembly 70, and a housing 40 configured to enclose at least a portion of the PTU 30. The input shaft 31 is configured to receive an input torque, such as from a component (e.g., a case, a carrier, a side-gear) of the front differential assembly 19, to rotate the input shaft 31 about an axis of rotation 34. According to an exemplary embodiment, the input shaft 31 is a hollow tube member coupled to the case of the front differential assembly 19 to receive torque from the differential assembly. The input shaft 31 may be made from steel, aluminum, an aluminum alloy, or any other suitable material strong enough to transmit the required torque for the life of the vehicle. According to an exemplary embodiment, the input shaft 31 is configured to extend in a direction transverse to the longitudinal (or travelling) direction of the vehicle, and includes a first end 32 and a second end 33. The first end 32 may be coupled to the front differential assembly 19, so that torque transmitted through the front differential assembly 19 may drive the input shaft 31 in the corresponding rotational direction with substantially the same torque and frequency. The second end 33 may be configured to output or transfer the torque received, such as to the disconnect shaft 36 through the activating or engaging mechanism (e.g., the first clutch mechanism 50).

The disconnect shaft 36 is configured to selectively rotate about the axis of rotation 34 to transfer torque. According to an exemplary embodiment, the disconnect shaft 36 is configured to selectively couple to the input shaft 31 through the activating mechanism (e.g., the first clutch mechanism 50) to transfer the torque from the input shaft 31 to the disconnect shaft 36. When coupled, the input shaft 31 and the disconnect shaft 36 rotate with substantially the same torque and frequency. The disconnect shaft 36 may also be selectively decoupled from the input shaft 31, whereby no torque is transferred from the input shaft 31 to the disconnect shaft 36. When decoupled, the input shaft 31 and the disconnect shaft 36 may rotate with different frequencies and torques.

Figure 5:
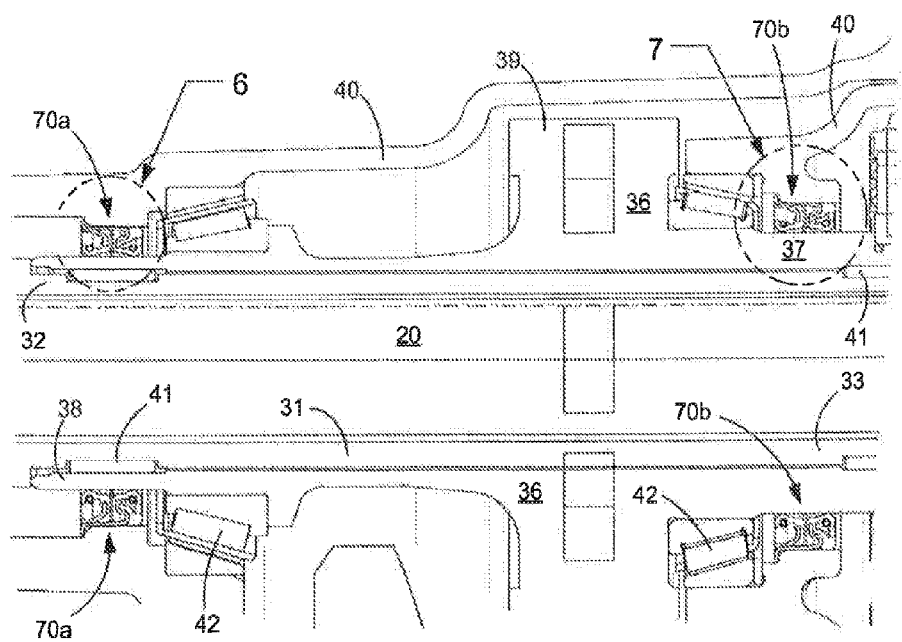
FIG. 5 is a detail view of the power transfer unit of FIG. 3 showing the seal assemblies provided between the disconnect shaft and the housing.
Figure 4:
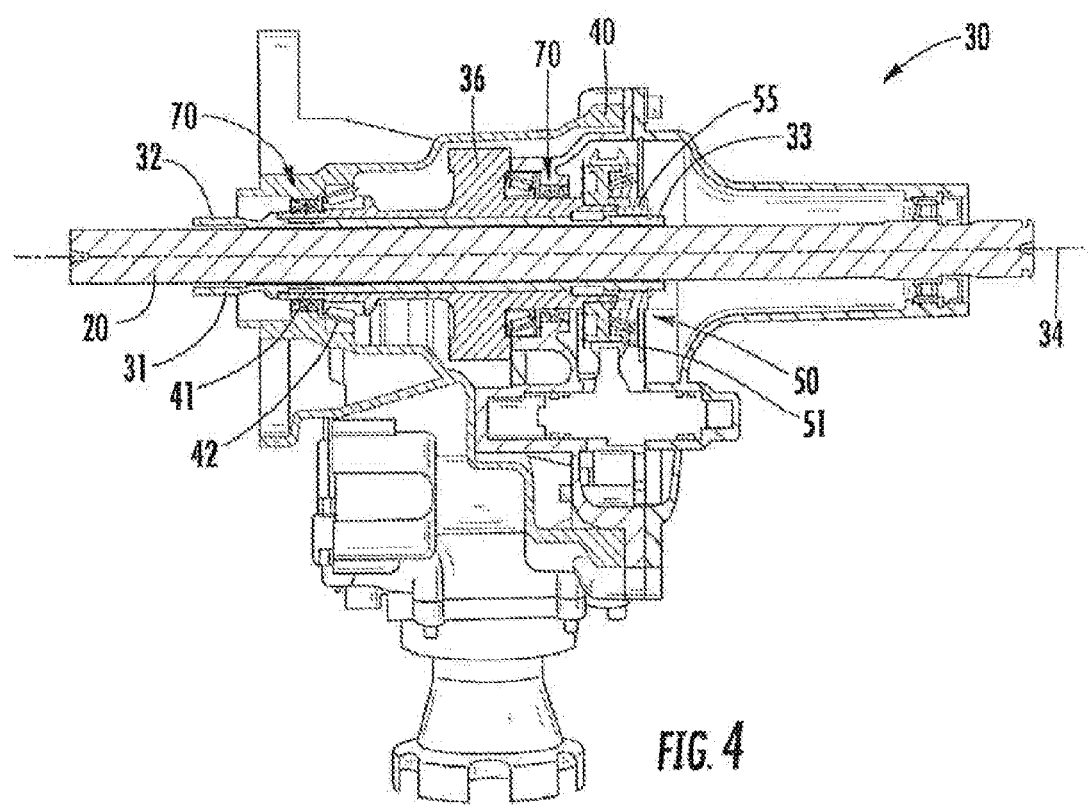
FIG. 4 is a top view of the power transfer unit of FIG. 3 configured with the disconnect shaft coupled to the input shaft, which corresponds to the vehicle being configured in the all-wheel drive mode of operation.

According to an exemplary embodiment, the disconnect shaft 36 is configured to include a first end 37, a second end 38 and a gear 39 provided between the first and second ends 37, 38 to transfer torque. According to other embodiments, the gear may be provided on the first end, on the second end, or anywhere along the length of the disconnect shaft 36. The first and second ends 37, 38 may be configured as hollow tubes having similar or dissimilar diameters. For example, the disconnect shaft 36 may be configured with first and second ends 37, 38 that may have similar inner diameters and may have dissimilar outer diameters. The gear 39 may be configured as a spur gear, a helical gear, a beveled gear, or any suitably shaped gear that transfers torque through motion (e.g., circular motion). As shown in FIGS. 4 and 5, the disconnect shaft 36 includes a hollow tube having a generally smooth inner surface and an irregular outer surface having a gear 39 extending from the outer surface. The hollow tubular disconnect shaft 36 may be configured to receive the input shaft 31. For example, the input shaft 31 may pass through the disconnect shaft 36 and extend beyond the first end 37 and/or the second end 38 of the disconnect shaft 36. The disconnect shaft 36 may be made from steel, aluminum, an aluminum alloy or any other suitable material strong enough to transmit the required torque for the life of the vehicle.

The PTU 30 may include bearings to allow for relative rotation between components therein and to improve efficiency, such as by reducing friction generated by rotation of the components therein, such as the rotation of the input shaft 31 relative to the disconnect shaft 36. According to an exemplary embodiment, the bearings (or needle bearings or bushings or journals) 41 may be provided between the disconnect shaft 36 and the input shaft 31 to allow for rotation of the input shaft 31 relative to the disconnect shaft 36. For example, the PTU 30 may include a first needle bearing 41 provided between the second end 38 of the disconnect shaft 36 and the first end 32 of the input shaft 31, and may include a second needle bearing 41 provided between the first end 37 of the disconnect shaft 36 and second end 33 of the input shaft 31, wherein the bearings 41 allow for concentric and efficient rotation of the input shaft 31 relative to the disconnect shaft 36. In other words, the input shaft 31 may pass through the hollow disconnect shaft 36 with the first needle bearing 41 provided between the inside surface of the second end 38 of the disconnect shaft 36 and the outside surface of the input shaft 31 and the second needle bearing 41 provided between the inside surface of the first end 37 of the disconnect shaft 36 and the outside surface of the input shaft 31. The PTU 30 may include additional bearings. For example, the PTU 30 may include bearings 42 provided between the housing 40 and the disconnect shaft 36 to allow concentric and efficient rotation of the disconnect shaft 36 relative to the housing 40 and/or the input shaft 31.

The PTU 30 may also include a clutch mechanism 50 that may couple the disconnect shaft 36 to the input shaft 31 when activated and may decouple the disconnect shaft 36 from the input shaft 31 when deactivated. According to an exemplary embodiment, the clutch mechanism 50 includes an engaging gear 51 and a hub 55. The inner surface of the hub 55 of the first clutch mechanism 50 may be fixedly connected to the outside surface of the input shaft 31, such as the outside surface of the second end 33 of the input shaft 31, wherein the hub 55 rotates about the axis of rotation 34 with the input shaft 31 having substantially the same torque and frequency. The engaging gear 51 may be slideably coupled to the hub 55, wherein the engaging gear 51 may rotate about the axis of rotation 34 with the same torque and frequency as the hub 55, yet the engaging gear 51 is configured to slide in the direction along the axis of rotation 34, relative to hub 55, when activated or driven, such as by an actuator. The inner surface of the engaging gear 51 may include gear teeth for engaging the disconnect shaft 36 or a gear member 56 to transfer the torque from the input shaft 31 through the first clutch mechanism 50 to the disconnect shaft 36. The gear member 56 may be formed separately from the disconnect shaft 36 then connected to the disconnect shaft 36, or may be integrally formed with the disconnect shaft 36, such as with the first end 37 of the disconnect shaft 36.

The PTU 30 and/or the clutch mechanism 50 may include a synchronizer 53, which may include at least one friction ring or cone, that is configured to engage the gear member 56 prior to engagement of the gear teeth of the engaging gear 51. The synchronizer 53 permits the engaging gear 51 and the gear member 56 to rotate with substantially the same torque and frequency prior to engagement of teeth between the engaging gear 51 and the gear member 56 to prohibit impact between the teeth upon engagement, which results when the teeth of two gears rotating with different frequencies and torques engage each other. The synchronizer 53 provides improved durability of the PTU 30 by reducing wear and damage on the first clutch mechanism 50 and the disconnect shaft 36 and/or the gear member 56 during selective coupling of the disconnect shaft 36 to the input shaft 31. According to an exemplary embodiment, the synchronizer 53 includes a double cone having friction material (typically a carbon based material) on both sides, to improve the efficiency of the synchronizer 53 and to allow for a reduced diameter to manage the loading. According to other embodiments, synchronizer 53 may include a single cone, triple cone, or other configuration to improve durability by reducing wear.

The PTU 30 may also include an output shaft 43 that is configured to transfer an output torque from the PTU 30, such as to the propshaft 29 or a rear drive unit 90 of the vehicle. The output shaft 43 may include a pinion 44 configured to receive the torque and a shaft 45 for transmitting the torque. The pinion 44 and shaft 45 may be formed separately then connected together to operate as one member, or may be integrally formed as one member. The output shaft 43 may be made from steel, aluminum, an aluminum alloy or any other suitable material strong enough to transmit the required torque for the life of the vehicle. The pinion 44 may be a gear, such as a beveled gear, that is configured to extend from one end of the shaft 45. The gear of the pinion 44 may be rotatably coupled through a gear mesh to another gear, such as the disconnect shaft 36 or a ring gear, to receive torque. The shaft 45 may extend in the longitudinal direction of the vehicle and may be configured to transfer torque in a direction transverse to the input shaft. The shaft 45 may be coupled to the propshaft 29 to transmit the torque received to the propshaft. The output shaft 43 may be provided within housing 40 of the PTU 30, or may be provided within a structure separate from the housing 40.

According to an exemplary embodiment, the PTU 30 also includes a second shaft assembly 60 that is configured to receive the torque from the disconnect shaft 36 and transfer the torque to the output shaft 43 or directly to the propshaft 29. The second shaft assembly 60 may include a second shaft 61 and a second ring gear 63, wherein the second shaft 61 is provided parallel and offset a distance from the input shaft 31. The second shaft 61 may be configured to rotate about a second axis of rotation, which may be parallel to the axis of rotation 34 of the input shaft 31. The second shaft 61 may include a gear 62, which may be configured as a spur gear, helical gear, or any suitable gear that transfers torque through motion (e.g., rotational motion). The teeth of the gear 62 may engage through a gear mesh the teeth of the gear 39 of the disconnect shaft 36 in order to receive torque from the disconnect shaft 36. The second ring gear 63 may be formed separately from then connected to the second shaft 61, or may be integrally formed with the second shaft 61 as one member. The second ring gear 63 may be a beveled gear (or a spur, helical, or any suitable gear) and is configured to transfer torque from the second shaft 61, such as to the pinion 44 of the output shaft 43. The second shaft assembly 60 may be provided within the housing 40 of the PTU 30 or may be provided within a structure separate from the housing 40. The second shaft 61 may be rotatably coupled to the housing (or structure) by one or more bearings in order to allow the second shaft 61 to rotate about the second axis of rotation relative to the housing 40.

According to another exemplary embodiment, the torque is transferred from the disconnect shaft 36 directly to the output shaft 43. According to another exemplary embodiment, the torque is transferred from the disconnect shaft 36 directly to a component external to the PTU 30, such as to the propshaft 29 of the vehicle.

Typically, the transmission and/or differential use a different lubricating fluid than the lubricating fluid of the PTU, due to the need to have different properties, such as kinematic viscosity. For example, the transmission and/or differential may use an automatic transmission fluid (ATF) to lubricate the internal components, while the PTU may use a conventional gear lube. Conventionally, seals have been used to prohibit a fluid from passing beyond the seal. Accordingly, a seal may be provided within the PTU to prohibit the mixing or cross-contamination of fluids. For example, the seal may be provided within the PTU to prohibit the transmission fluid from passing into the PTU and/or to prohibit gear lube from exiting the PTU and passing into the transmission.

According to the exemplary embodiment shown in FIG. 5, the PTU 30 includes two seal assemblies 70a, 70b provided between the housing 40 and the disconnect shaft 36 to prohibit fluid (e.g., ATF, gear lube, etc.) from passing beyond the seal assembly 70. The first or inner seal assembly 70a is provided between the housing 40 and the second end 38 of the disconnect shaft 36. The housing 40 may include an extension that is configured to abut and support the inner seal assembly 70a. The inner seal assembly 70a may prohibit the flow of ATF (or other lubricant or fluid) from passing from the transmission or differential into the PTU 30, and may also prohibit the flow of gear lube or other lubricant or fluid from passing from the PTU 30 into the transmission or differential. The second or outer seal assembly 70b is provided between the housing 40 and the first end 37 of the disconnect shaft 36 adjacent to the clutch mechanism 50. The housing 40 may further include a second extension that is configured to abut and support the outer seal assembly 70b. The outer seal assembly 70b may prohibit the flow of gear lube or other fluid from passing beyond the seal and out of the PTU 30. For example, the outer seal assembly 70b may prohibit gear lube from exiting the PTU 30 and infiltrating the clutch mechanism 50, which could impact the performance of a clutch mechanism, such as a friction clutch. Also, the clutch mechanism may be configured to activate and deactivate by changes in fluid pressure. In this case, the outer seal assembly 70b could prohibit the mixing of fluid between the clutch mechanism and the PTU.

Figure 6:
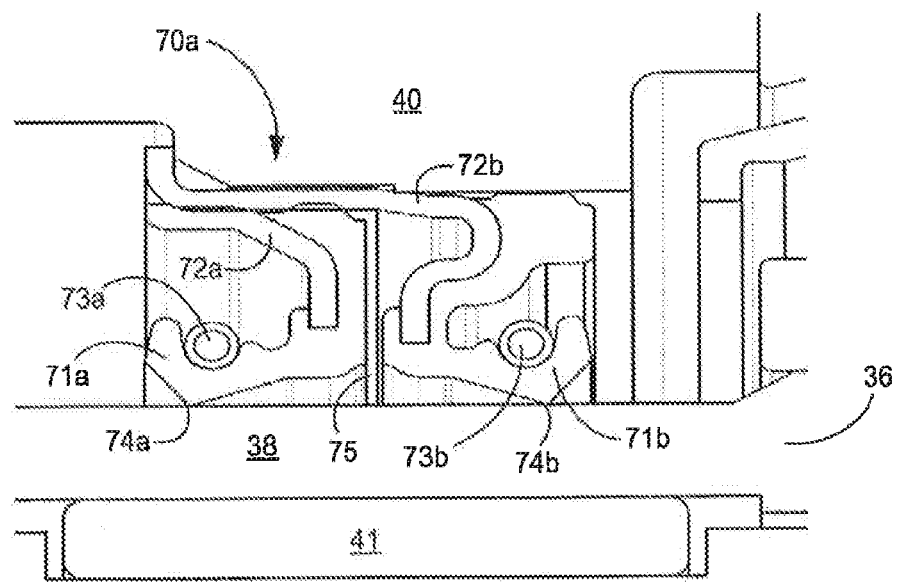
FIG. 6 is a detail view of the inner (or inboard) seal assembly of the power transfer unit of FIG. 5.
Figure 7:
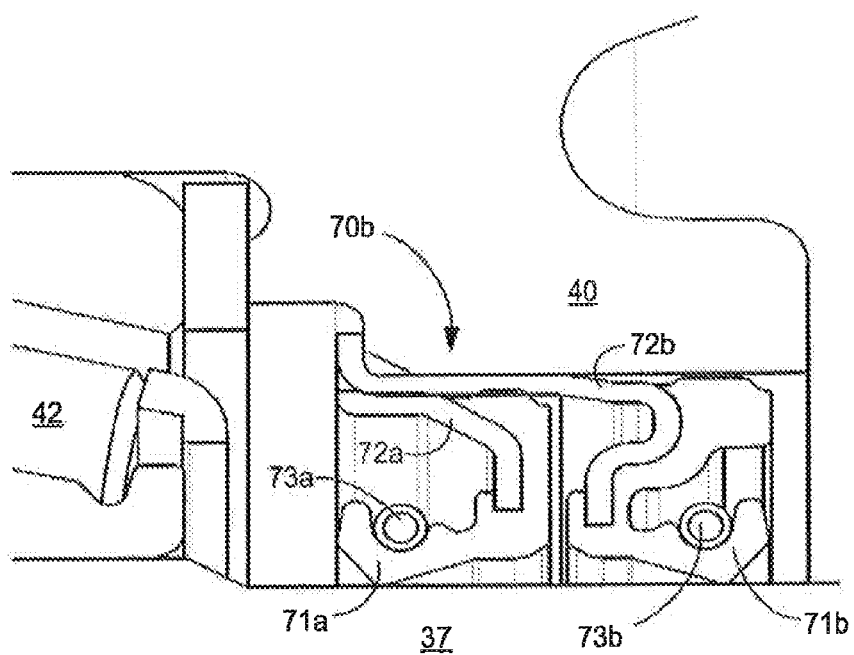
FIG. 7 is a detail view of the outer (or outboard) seal assembly of the power transfer unit of FIG. 5.

FIGS. 6 and 7 illustrate an exemplary embodiment of each seal assembly 70a, 70b. FIG. 6 illustrates the inner seal assembly 70a provided between the second end 38 of the disconnect shaft 36 and the housing 40. FIG. 7 illustrates the seal assembly 70b provided between the first end 37 of the disconnect shaft 36 and the housing 40. Each seal assembly 70a, 70b may include a lip member 71, a support member 72 and a biasing member 73.

The lip member 71 of each seal assembly 70 may provide sealing to a first device, such as to the disconnect shaft 36, which may be in motion relative to the seal assembly 70 and/or lip member 71. The lip member 71 may be made from any suitable material capable of withstanding the temperatures, chemicals, and stresses the seal assembly 70 is subjected to during operation over the life of the vehicle. As examples, the lip member 71 may be made from an elastomer (e.g., FKM) or elastomeric material, an advanced composite material, or a polymer or advanced polymer matrix composite. As another example, the lip member 71 may be made from a fluoroelastomer (FKM) that includes vinylidene fluoride (VDF) in order to have a relatively high heat and chemical resistance when compared to conventional elastomers. The lip member 71 may be resilient in order to improve the seal formed between the seal assembly 70 and the abutting components, such as the housing 40 and disconnect shaft 36. For example, by being resilient, the lip member 71 may be moved (displaced or bent) into contact with the disconnect shaft 36 to form a relatively impervious seal. The lip member 71 may be moved by the biasing member 73, such that after contact between the lip member 71 and the disconnect shaft 36, the biasing member 73 continues to impart a retaining force on the lip member 71 to maintain an effective impervious seal.

The support member 72 of each seal assembly may connect to and/or provide sealing to a second device, such as to the housing 40. For example, the support member 72 may be coupled to or may abut an extension of the housing 40 to form a seal between the housing 40 and the seal assembly 70. The support member 72 may be configured to provide structural support to the lip member 71. For example, the lip member 71 may include a first portion that is coupled to (and/or retained by) the support member 72. The support member 72 may be made from steel, aluminum, aluminum alloy or any suitable material that can withstand the temperatures, chemicals, and stresses the seal assembly 70 is subjected to during operation over the life of the vehicle.

The biasing member 73 of each seal assembly 70 may be configured to provide a force, such as a spring force to bias at least a portion of the lip member 71 away from at least a portion of the support member 72 to improve the seal formed by the seal assembly 70. For example, the biasing member 73 may be configured to bias a second portion of the lip member 71 relative to the second portion of the lip member 71 that is coupled to and/or retained by the support member 72.

According to an exemplary embodiment, each seal assembly 70 includes a first lip member 71a, a second lip member 71b, a first support member 72a, a second support member 72b, a first biasing member 73a, and a second biasing member 73b. The second support member 72b may abut a portion of the housing 40, forming a seal thereto, and support the second lip member 71b, which may be coupled thereto. The first support member 72a may be connected to the second support member 72b, and may support the first lip member 71a, which may be coupled thereto. The first and second lip members 71a, 71b may include contact surfaces 74a, 74b that are configured to abut the second end 38 of the disconnect shaft 36, forming a seal thereto. Each contact surface of each lip member 71 may be provided on a portion of the respective lip member 71 that is offset from the location where the lip member 71 connects to and is supported by the support member 72. This configuration may ensure that as the pressure in the PTU 30 increases, the sealing force imparted on the lip member 71 in the direction of engagement with the adjacent disconnect shaft 36 increases to maintain an adequate seal strength to prohibit the transfer of fluid across the seal. In other words, the imperviousness of the seal assembly 70 is configured to increase with a corresponding increase in the internal pressure of the power transfer unit 30.

The biasing member 73a, 73b may also be configured adjacent to the portion of the respective lip member 71a, 71b having the contact surface 74a, 74b to ensure adequate sealing. For example, the lip member 71a may include a recess that is configured to receive the biasing member 73a therein, wherein the recess is located adjacent to the contact surface 74a. Accordingly, the force from the biasing member 73a may be directed from the recess to the contact surface 74a that is in contact with, for example, the disconnect shaft 36 to improve the seal therebetween. Thus, the first contact surface 74a of the first lip member 71a may be biased by the first biasing member 73a into engagement with the disconnect shaft 36. The second lip member 71b may be configured similar to the first lip member 71a. For example, the second contact surface 74b of the second lip member 71b may be biased by the second biasing member 73b into engagement with the disconnect shaft 36.

Each seal assembly 70 may further include a gate or weep hole 75, which may be provided between the lip members 71a, 71b and may align with an aperture (not shown) in the housing 40. In the event that the lip member 71 leaks and fluid passes beyond the contact surface 74 forming the seal, the gate 75 transfers the fluid outside the housing through the aperture in the housing. The presence of fluid, such as on the ground below the housing of the vehicle, can alert the operator of the vehicle that the seal assembly 70 is not adequately sealing. The gate 75 may prevent the intermixing of fluids, such as ATF with gear lube, by ensuring if one seal does leak, then the fluid is exited the seal system 70 and/or the PTU 30.

Figure 8:
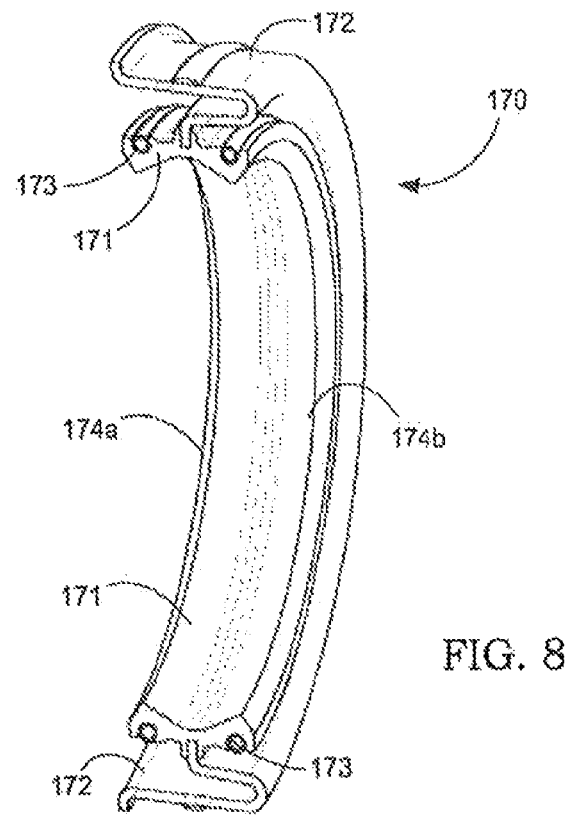
FIG. 8 is a perspective view of a portion of another exemplary embodiment of a seal assembly for use in a power transfer unit.
Figure 9:
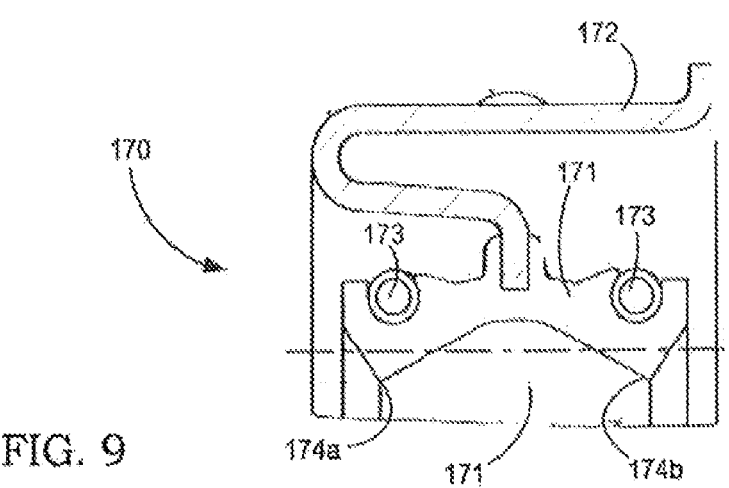
FIG. 9 is an cross-sectional view of the seal assembly of FIG. 8.

FIGS. 8 and 9 illustrate another exemplary embodiment of a seal assembly 170 for use in a PTU, such as the PTU 30. The seal assembly 170 is intended to be provided at each of the inner and outer locations of the PTU 30 for use as the seal assemblies 70, according to another exemplary embodiment. Each seal assembly 170 includes a lip member 171, a support member 172 for supporting the lip member 171, and two biasing members 173 for providing spring forces to bias the ends of the lip member 171 away from the support member 172 and into contact with the mating disconnect shaft 36. The lip member 171 has two ends or end portions, each end extending from a center portion that is configured to be supported by the support member 172. Each end of the lip member 171 also includes a contact surface 174a, 174b configured to abut and seal to a device or component of the PTU 30, such as the disconnect shaft 36. It should be noted that the exemplary embodiments shown in FIGS. 6-9 are not meant as limitations. Although these embodiments illustrate seal assemblies 70 configured to provide a double seal, seal assemblies configured to provide a single seal or a plurality of seals may be used as well, and the configuration of the seal assemblies may be varied from those disclosed herein.

The PTUs 30, as disclosed herein, are configured to have seal assemblies that are provided between the disconnect shaft 36 and the housing 40, as opposed to being provided between the input shaft 31 and the housing 40. There are several advantages to positioning the seal assemblies between the housing and the disconnect shaft.

One advantage in this configuration of the seal assemblies 70, 170 being provided between the disconnect shaft 36 and the housing 40 is it reduces the loss of energy through the PTU 30, which correlates to an increase in the efficiency of the drive train system of the vehicle. The seal assemblies 70, 170 of PTUs 30 are provided between a moving component (e.g., input shaft 31, disconnect shaft 36) and a non-moving component (e.g., housing 40). When the moving component is in motion, the seal assembly 70,170 is subjected to dynamic contact or sealing with the moving component, which generates friction, heat, etc. that results in lost energy and a reduction of efficiency of the PTU and the drive train of the vehicle. Therefore, if the amount of time the seal assembly of the PTU operates in dynamic contact can be reduced, the energy loss can be reduced and the efficiency increased. The input shaft 31 of the PTU 30 is in motion whenever the vehicle is in motion, since it is driven by the front differential assembly 19 of the vehicle. Therefore, if the seal assembly 70, 170 is configured between the input shaft 31 and the housing 40, the PTU 30 suffers from a loss of energy due to dynamic contact of the seal assembly 70, 170 whenever the vehicle is in motion. Thus, under this configuration the vehicle drive train and PTU 30 suffer from a reduction of energy through dynamic seal losses when the vehicle is operating in both the two-wheel drive mode and in the all-wheel drive mode.

The seal assemblies 70,170, as disclosed herein, provided between the housing 40 and the disconnect shaft 36 are in dynamic contact only when the PTU 30 is transferring torque and power to the rear wheels or propshaft of the vehicle (i.e., when the vehicle is operating in the all-wheel-drive mode). Thus, the vehicle having a PTU 30 configured as disclosed herein operates in two-wheel drive mode without a reduction of energy from the seal assemblies, since the seal assemblies are not in dynamic operation. The resulting increase in efficiency is significant because the vehicles having PTUs 30 to provide an all-wheel drive mode of operation, typically, operate a majority of their time in the two-wheel drive mode of operation, since the vehicles typically engage the PTU 30 to transfer torque to the rear wheels only when one or both of the front wheels slip, such as during inclement weather.

Another advantage in this configuration of the seal assemblies 70, 170 is it permits the lubrication of the needle bearings 41 (as shown in FIG. 5) without the use of a special method or without the need for additional components, which reduces the cost and increases the longevity of the PTU 30. The needle bearings 41 may be provided between the disconnect shaft 36 and the input shaft 31 to maintain concentricity between the shafts and to permit efficient rotation of the input shaft 31 relative to the disconnect shaft 36 when the PTU 30 operates with the disconnect shaft 36 decoupled from the input shaft 31. When the seal assembly is provided between the input shaft 31 and the housing 40, the seal prohibits lubricating fluid (e.g., ATF) from being able to pass beyond the seal to lubricate the needle bearings 41. However, the seal assemblies 70,170, as disclosed herein, provided between the housing 40 and the disconnect shaft 36 allow for lubricating fluid to enter the gap formed by the clearance between the disconnect shaft 36 and the input shaft 31 to maintain proper lubrication of the needle bearings during the life of the vehicle. For example, the fluid entrance gap may be formed by the clearance between the edge of the second end 38 of the disconnect shaft 36 and the input shaft 31. Upon entering the fluid entrance gap, the lubricating fluid may flow along the length of the shafts in the radial gap formed by the clearance between the inner diameter of the disconnect shaft 36 and the outer diameter of the input shaft 31 to lubricate all the needle bearings with in the PTU 30, since the PTU 30 may include a plurality of needle bearings between the input shaft 31 and disconnect shaft 36. Proper lubrication of the needle bearings 41 improves longevity of the operating life of the PTU 30, as well as reduces the friction and dynamic energy loss generated, further improving efficiency of the PTU 30 and drive train of the vehicle.

Another advantage in this configuration of the seal assemblies 70, 170 is that the synchronizers, such as the synchronizer 53 provided in the first clutch mechanism 50, perform better when lubricated by ATF than when lubricated by gear lube. For example, the outer seal 70b being provided between the disconnect shaft 36 and the housing 40, opposed to being provided between the input shaft 31 and the housing 40, may retain the gear lube in the PTU 30 to lubricate the PTU 30 and prevent the gear lube from commingling or contaminating the ATF that may be used to lubricate the synchronizers 53, such as the synchronizer 53 of the first clutch mechanism 50. The seal assembly 70, 170 may also retain the ATF, preventing its flow into the PTU 30 to commingle with the gear lube provided therein.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the power transfer units as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A power transfer unit for a vehicle, comprising:
a first shaft configured to receive an input torque from a first vehicle component;
a second shaft configured to selectively receive the torque from the first shaft and transmit the torque to a second vehicle component, the second shaft having a first end and a second end;
an engaging mechanism configured to operate in a first mode and a second mode, when in the first mode the engaging mechanism selectively couples the second shaft to the first shaft, when in the second mode the second shaft is decoupled from the first shaft;
a housing configured to enclose at least a portion of the power transfer unit; and
a seal system having a first seal and a second seal, the first seal being disposed between the housing and the first end of the second shaft, the second seal being disposed between the housing and the second end of the second shaft, wherein the first seal includes a first support member, a first biasing member, and a first lip member having a first portion that is coupled to the first support member and a second portion that is biased by the first biasing member, and the first seal includes a second support member, a second biasing member, and a second lip member having a first portion that is coupled to the second support member and a second portion that is biased by the second biasing member and wherein the first support member is connected to the second support member independently of the housing, first shaft and second shaft.

2. The power transfer unit of claim 1, wherein the first support member abuts the housing and the second portion of the first lip member is biased into engagement with the second shaft.

3. The power transfer unit of claim 1, wherein the second support member abuts the housing, the first support member is connected directly to the second support member, the second portion of the first lip member is biased into engagement with a first portion of the second shaft, and the second portion of the second lip member is biased into engagement with a second portion of the second shaft.

4. The power transfer unit of claim 1, wherein the first seal further includes a gate that extends through the first seal and communicates with an outside surface of the housing to transfer fluid to outside of the power transfer unit.

5. The power transfer unit of claim 4, wherein the gate is disposed between the first lip member and the second lip member.

6. The power transfer unit of claim 1, wherein the first support member abuts a portion of the housing, and wherein the first lip member includes a first contact surface that is biased by the first biasing member into engagement with a first portion of the second shaft.

7. The power transfer unit of claim 6, wherein each of the first and second seals further includes a second biasing member that is configured to bias a second contact surface of the first lip member into engagement with a second portion of the second shaft.

8. The power transfer unit of claim 1, wherein a first fluid is retained in a volume enclosed by the first and second seals.

9. The power transfer unit of claim 8, further comprising a needle bearing provided between the first shaft and the second shaft to permit efficient rotation of the first shaft relative to the second shaft when the second shaft is decoupled from the first shaft.

10. The power transfer unit of claim 9, wherein a second fluid different from the first fluid is used to lubricate the needle bearing, and wherein the seal system prohibits mixing of the first and second fluids.

11. The power transfer unit of claim 1, wherein the first vehicle component is a front differential assembly and the second vehicle component is a propshaft for communicating torque to a set of rear wheels of the vehicle.

12. The power transfer unit of claim 1, wherein the engaging mechanism is a clutch mechanism that is disposed external to a volume enclosed by the first and second seals.

13. The power transfer unit of claim 1, wherein the second shaft is a hollow shaft and the first shaft is received by the second shaft.

14. The power transfer unit of claim 1 wherein the second seal includes a first support member, a first biasing member, and a first lip member having a first portion that is coupled to the first support member of the second seal and a second portion that is biased by the first biasing member of the second seal, and the second seal further includes a second support member, a second biasing member, and a second lip member having a first portion that is coupled to the second support member of the second seal and a second portion that is biased by the second biasing member of the second seal.

15. The power transfer unit of claim 4, wherein the first lip member includes a contact surface engaged with the second shaft, the second lip member includes a contact surface that also is engaged with the second shaft, and the gate is disposed between the contact surface of the first lip member and the contact surface of the second lip member.

16. A power transfer unit for a vehicle, comprising:

a first shaft configured to receive an input torque from a first vehicle component;

a second shaft configured to selectively receive the torque from the first shaft and transmit the torque to a second vehicle component;

an engaging mechanism having a first mode in which the second shaft is coupled to the first shaft, and a second mode in which the second shaft is decoupled from the first shaft;

a housing enclosing at least a portion of the power transfer unit, with the second shaft rotating relative to the housing; and a seal disposed between the housing and the second shaft and including a support member engaging the housing, a first biasing member, a second biasing member, and at least one lip member, said at least one lip member having a portion that is coupled to the support member, a first contact surface and a second contact surface, wherein the first biasing member urges the first contact surface into engagement with the second shaft and the second biasing member urges the second contact surface into engagement with the second shaft at a location spaced from the first contact surface.

17. The power transfer unit of claim 16 wherein said first contact surface and said second contact surface are defined on the same lip member.

18. The power transfer unit of claim 16 wherein said first contact surface is defined on a first lip member and said second contact surface is defined on a second lip member, and wherein said support member comprises a first support member and wherein the seal also includes a second support member connected to the first support member, and wherein the first lip member is coupled to the first support member and the second lip member is coupled to the second support member.

19. The power transfer unit of claim 16 which also includes a second seal disposed between the housing and the second shaft, spaced from the other seal and wherein the second seal includes a support member engaging the housing, a first biasing member, a second biasing member, and at least one lip member, said at least one lip member of the second seal having a portion that is coupled to the support member of the second seal, a first contact surface and a second contact surface, wherein the first biasing member of the second seal urges the first contact surface of the second seal into engagement with the second shaft and the second biasing member of the second seal urges the second contact surface of the second seal into engagement with the second shaft at a location spaced from the first contact surface of the second seal.

* * * * *